United States Patent

Shioyama et al.

[11] Patent Number: 5,501,908
[45] Date of Patent: Mar. 26, 1996

[54] RUBBER COMPOSITION AND TRANSMISSION BELT USING THE SAME

[75] Inventors: Tsutomu Shioyama; Naoki Hamano; Masaaki Ogino, all of Kobe, Japan

[73] Assignee: Bando Chemical Industries, Ltd., Kobe, Japan

[21] Appl. No.: 206,835

[22] Filed: Mar. 7, 1994

Related U.S. Application Data

[63] Continuation-in-part of Ser. No. 37,430, Mar. 26, 1993, abandoned.

[51] Int. Cl.$^6$ .............................. F16G 1/08; F16G 1/04; F16G 5/06; B32B 25/02
[52] U.S. Cl. .................... 428/395; 428/365; 428/288; 428/303; 474/263; 474/260; 525/63
[58] Field of Search .............................. 525/179, 66, 432, 525/76, 935, 63; 523/206, 221; 474/263, 260, 261, 268, 271; 428/375, 295, 365, 395, 288, 303

[56] References Cited

U.S. PATENT DOCUMENTS

| | | | |
|---|---|---|---|
| 4,869,711 | 9/1989 | Komai | 474/263 |
| 4,899,323 | 2/1990 | Fukahori et al. | 367/176 |
| 5,049,610 | 9/1991 | Takaki et al. | 524/514 |
| 5,219,902 | 6/1993 | Mishima et al. | 523/206 |
| 5,225,457 | 7/1993 | Borowczak et al. | 523/220 |

FOREIGN PATENT DOCUMENTS 0150598  12/1984  European Pat. Off. .

*Primary Examiner*—Paul R. Michl
*Assistant Examiner*—Mark L. Warzel
*Attorney, Agent, or Firm*—Sixbey, Friedman, Leedom & Ferguson; Gerald J. Ferguson, Jr.; Thomas W. Cole

[57] ABSTRACT

A rubber composition containing a rubber forming a continuous phase of 100 weight parts; a nylon fiber with fine diameter of 1–15 weight parts by the fiber, the nylon fiber being grafted with a molecular of a rubber capable of co-crosslinking to the rubber forming the continuous phase; and a short fiber of 1–30 weight parts is used to at least a part of a rubber of a transmission belt. Thus, high anisotropy in modulus of elasticity in the transmission belt is maintained. Further, stress concentration at an interface of the short fiber and the rubber is distributed to enhance the strength, elasticity and flex fatigue resistance.

12 Claims, 1 Drawing Sheet

5,501,908

RUBBER COMPOSITION AND TRANSMISSION BELT USING THE SAME

This application is a continuation-in-part of application Ser. No. 08/037,430, filed Mar. 26, 1993, now abandoned.

BACKGROUND OF THE INVENTION

This invention relates to a rubber composition with high strength, high elasticity and superior flex fatigue resistance, and a transmission belt using the same.

Conventionally, in a transmission belt for driving an auxiliary, a short fiber is mixed to a tension rubber, a compression rubber or a ribbed rubber for reinforcement.

A transmission belt for an automobile, for example, is required to have a long lifetime and to be maintenance free.

However, while the conventional transmission belt in which the short fiber is merely mixed with a rubber has high rigidity (deformation resistance) in an oriented direction of the short fiber, the short fiber and the rubber is so different in elasticity that stress due to flex fatigue concentrates at an interface of the short fiber and the rubber to cause premature cracking. This causes the belt to have a shortened lifetime.

This invention is made with a view to correct the above disadvantage and has its object of providing a rubber composition and a transmission belt with high strength, high elasticity and superior flex fatigue resistance by improving the fiber mixed with the rubber.

To attain the above object, a rubber composition comprises: a rubber forming a continuous phase of 100 weight parts; a nylon fiber having a diameter of about 0.3 µm and a length of about 300 µm of 1 to 15 weight parts by the fiber, the nylon fiber being grafted with a rubber capable of co-cross-linking to the rubber forming the continuous phase, and a nylon fiber having a diameter of between about 100 and 50 µm and a length of between about 0.3 and 6.0 mm of 10 to 30 weight parts.

A transmission belt comprises at least a part composed of a rubber composition containing: a rubber forming a continuous phase of 100 weight parts; a nylon fiber having a diameter of about 0.3 µm and a length of about 300 µm of 1 to 15 weight parts by the fiber, the nylon fiber being grafted with a rubber capable of co-cross-linking to the rubber forming the continuous phase, and a nylon fiber having a diameter of between about 10 and 50 µm and a length of between about 0.3 and 6.0 mm of 1 to 30 weight parts.

Accordingly, the rubber layer is reinforced with the fine-diameter nylon fiber grafted with the rubber and the stress concentration at the interface of the short fiber and the rubber is distributed to an interface of the rubber and the fine-diameter nylon fiber as well, so as not to cause cracking. Thus, the anisotropy in modulus of elasticity (ratio of a longitudinal direction and a transverse direction) is maintained high and a transmission belt with high strength, high elasticity, superior flex fatigue is obtained.

PREFERRED EMBODIMENT OF THE INVENTION

Figure 1:
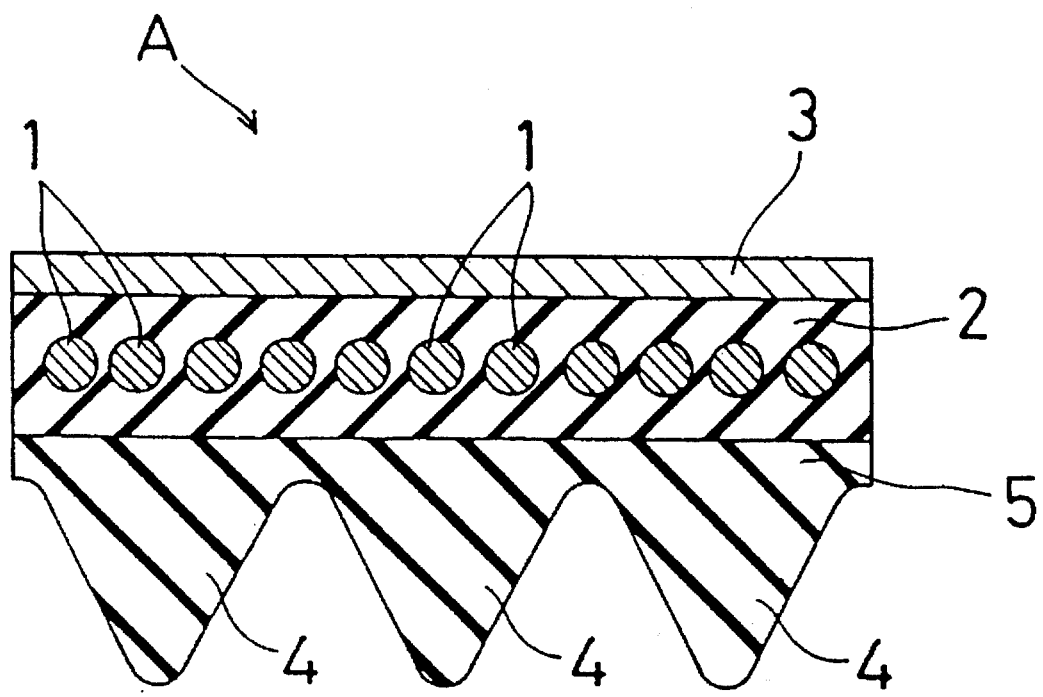
FIG. 1 is a cross section of a V-ribbed belt.

Description is made below about a rubber composition and a transmission belt using the same according to an embodiment of the present invention.

The rubber composition contains a rubber forming a continuous phase of 100 weight parts, a nylon fiber having a diameter of about 0.3 µm and a length of about 300 µm of 1 to 15 weight parts by the fiber, the nylon fiber being grafted with a rubber capable of co-cross-linking to the rubber forming the continuous phase, and a nylon fiber having a diameter of between about 10 and 50 µm and a length of between about 0.3 and 6.00 mm of 1 to 30 weight parts.

As the rubber forming the continuous phase, i.e., a base polymer, hydrogenated acrylonitrile butadiene rubber, chlorosulfonated polyethylene rubber, alkylated chlorosulfonated polyethylene rubber, chloroprene rubber and the like are suitable.

The hydrogenated acrylonitrile butadiene rubber is obtained by adding hydrogen to a copolymer of acrylonitrile and 1,3-butadiene and saturating the double bonds existing in conjugative diene monomer therein. The amount of acrylonitrile butadiene rubber per monomeric unit in the hydrogenated acrylonitrile butadiene rubber is 10–60 weight %. The amount of conjugative diene per monomeric unit therein is not exceeding 30 weight % by means of partial hydrogenation. The molecular weight, glass transition temperature, hydrogenation rate and the like of the hydrogenated acrylonitrile butadiene rubber are not limited. In general, the hydrogenation rate of the double bonds of the conjugative diene monomer is 10–99%, preferably 80–95%.

The chlorosulfonated polyethylene rubber is obtained by reacting polyethylene rubber with chlorine and sulfur dioxide to be chlorosufonated, and the chlorination rate per polyethylene monomeric unit is 25–43%, preferably 25–35%. The chlorosulfonation rate is 0.9–1.5%, preferably 0.9–1.3%.

The same rubber as the base polymer is used as the rubber capable of co-crosslinking to the base polymer. Following combinations are preferable: base polymer of hydrogenated acrylonitrile butadiene rubber and co-crosslinkable rubber of acrylonitrile butadiene rubber and hydride thereof; base polymer of chlorosulfonated polyethylene rubber and co-crosslinkable rubber of chlorosulfonated polyethylene rubber; base polymer of alkylated chlorosulfonated polyethylene rubber and co-crosslinkable rubber of alkylated chlorosulfonated polyethylene rubber; base polymer of chloroprene rubber and co-crosslinkable rubber of chloroprene rubber, chlorosulfonated polyethylene rubber or alkylated chlorosulfonated polyethylene rubber.

The nylon fiber with the fine diameter which is grafted with the rubber capable of co-crosslinking to the base polymer is obtained by mixing and kneading, at a temperature higher than a melting point of thermoplastic polyamide, for example, synthetic rubber capable of being vulcanized (100 weight parts), thermoplastic polyamide particle (50 weight parts), tackifier (0.5–20 weight parts), novolac phenol resin (0.2–5 weight parts per 100 weight parts of total amount of the synthetic rubber and the thermoplastic polyamide particle), and a compound capable of generating formaldehyde by heating (1–50 weight parts per 100 weight parts of novolac phenol resin) and by extruding and winding the mixture.

The amount of the fine-diameter nylon fiber grafted with the rubber capable of co-crosslinking to the base polymer is preferable to be set within a range from 1 to 15 weight parts by only the fiber. The reason why the nylon fiber rate is set within the range is that an effect of adding the nylon fiber is not sufficiently obtained with less than 1 weight part and the anisotropy in modulus of elasticity with respect to longitudinal/transverse directions is not sufficiently displayed with more than 15 weight parts. Also, the fine-diameter nylon fiber has a 0.3 μm length because such a nylon fiber is actually manufactured.

As to the short fiber, for example, polyester short fiber, nylon short fiber and aramid short fiber are used. With a short fiber amount of 1–30 weight parts, the anisotropy in modulus of elasticity is efficiently obtained. Also, the reason why the diameter of the short fiber is set within the range of between 10 and 50 is that the rigidity in a belt width direction is less in a belt with short fiber of less than 10 μm diameter, which causes severe wear with shortened belt lifetime; and the short fiber of more than 50 μm diameter serves as foreign matter and is likely to come off during belt running, which causes wear. The reason of setting of the length thereof within the range of between 0.3 and 6.00 mm is the same.

In the thus obtained fine-diameter nylon fiber, the rubber molecular grafted with the nylon is co-crosslinked, with a crosslinking reaction of the base polymer, to be completely adhered to the base polymer. In the conventional rubber composition to which merely the short fiber is added, strain stress in the longitudinal direction is enhanced and the anisotropy in modulus of elasticity is high, but stress concentrates at the interface of the short fiber and the rubber to cause cracking, which lowers fatigue resistance. In contrast, in the present invention, by adding both the short fiber and the fine-diameter nylon fiber grafted with the rubber, the high anisotropy in modulus of elasticity is maintained in the rubber and the stress concentration at the interface of the short fiber and the rubber is distributed as well to an interface of the rubber and the fine-diameter nylon fiber, thus enhancing strength, elasticity and fatigue resistance.

In addition, the rubber composition in the present invention contains an accelerator activator (crosslinking agent). As the accelerator activator, sulfur or organic peroxides is used when the base polymer is hydrogenated acrylonitrile butadiene rubber. As the organic peroxides, diazo compound is preferable such as benzoyl peroxide, lauroyl peroxide, di-tertiary butyl peroxide, acetyl peroxide, tertiary butyl peroxybenzoic acid, dicumyl peroxide, peroxybenzoic acid, tertiary butyl peroxypivalate, 2,2'-azobis isobutyronitrile. The organic peroxides are used solely or in combination. The ratio of the organic peroxides is 0.2–10 weight parts per 100 weight parts rubber.

When the base polymer is chlorosulfonated polyethylene rubber or alkylated chlorosulfonated polyethylene rubber, magnesia, litharge, polyhydric alcohol and an accelerating agent are preferable to be added thereto.

Further, various kinds of additives generally used in rubber industry fields such as a reinforcement (carbon black, silica, and the like) a filler (calcium carbonate, talc, and the like) a accelerator activator, a vulcanization accelerator, a plasticizer, a stabilizer, a processing aid, an antioxidant, a colorant are optionally added to the rubber composition in the present invention according to uses.

A V-ribbed belt A as a transmission belt made of the rubber composition is described with reference to FIG. 1.

The V-ribbed belt A has an adhesive rubber layer 2 in which a plurality of tensile cords 1 are embedded, a rubber coating cloth 3 on the upper surface of the adhesive rubber 2, and a ribbed rubber layer 5 with three ribs 4 on the lower surface thereof. The adhesive rubber layer 2, the rubber coating cloth 3 and the ribbed rubber layer 5 are formed integrally. The ribbed rubber layer 5 is composed of the above rubber composition.

Working Examples of the present invention are described in detail.

(WORKING EXAMPLE 1)

The rubber composition of hydrogenated acrylonitrile butadiene rubber indicated in Table 1 is mixed and kneaded by Banbury mixer, then rolled by a calendar roll to orient a short fiber of nylon-66 (3 mm length) in a belt width direction, thus obtaining an unvulcanized rubber sheet. An amount of the short fiber added is 10 wt. % together with the fine-diameter nylon fiber grafted with a rubber. The unvulcanized rubber sheet is vulcanized at 160° C. for 30 minutes to obtain a vulcanized rubber sheet. The property of the vulcanized rubber sheet is indicated in Table 1.

The V-ribbed belt A is made using the unvulcanized rubber sheet as the ribbed rubber layer 5. In detail, as shown in FIG. 1, the 975 mm V-ribbed belt A with three ribs are obtained by forming the rubber coated cloth 3 on the upper surface of the adhesive rubber layer 2 in which the plural tensile cords 1 are embedded and forming the ribbed rubber layer 5 with three ribs 4 on the lower surface thereof. A running test is conducted to measure a lifetime of the belt applying a dynamic fatigue. The results are indicated in Table 1.

In the running test the belt is trained to a 120 mm drive pulley (the number of rotations=4900 rpm), a 120 mm driven pulley (load=16 horsepower) and a 70 mm idler pulley (set weight (tensile) 85 kgf), and is run under 85° C.

In the present invention 2 in Table 1, respective added amounts of the fine-diameter nylon fiber (NBR-11) and the short fiber (nylon-6.6) which are contained in the vulcanized rubber composition are varied and the respective V-ribbed belts are obtained using the vulcanized rubber compositions. Each running belt lifetime thereof is shown in Table 5.

Further in the present invention 2 in Table 2, the diameter and the length of the short fiber (nylon-6.6) contained in the vulcanized rubber composition are varied, and the respective V-ribbed belts are obtained using the vulcanized rubber compositions. Each running belt lifetime thereof is shown in Table 6.

TABLE 1

|  | present invention | | | | comparable examples | |
| --- | --- | --- | --- | --- | --- | --- |
|  | 1 | 2 | 3 | 4 | 1 | 2 |
| unvulcanized rubber composition (weight part) | | | | | | |
| H-NBR 1) | 100 | 100 | 100 | 100 | 100 | 100 |
| NBR-II 2) | 5 | 10 | 30 | 5 | — | 60 |
| FEF carbon | 40 | 40 | 40 | 40 | 40 | 40 |
| zinc oxide | 5 | 5 | 5 | 5 | 5 | 5 |

TABLE 1-continued

|  | present invention | | | | comparable examples | |
|---|---|---|---|---|---|---|
|  | 1 | 2 | 3 | 4 | 1 | 2 |
| stearic acid | 1 | 1 | 1 | 1 | 1 | 1 |
| sulfur | 0.5 | 0.5 | 0.5 | — | 0.5 | 0.5 |
| vulcanization accelerator | 3 | 3 | 3 | — | 3 | 3 |
| peroximon F-40 3) | — | — | — | 5 | — | — |
| nylon-66 4) | 13 | 10 | 3 | 13 | 15 | — |
| Vulcanized rubber property (transverse direction) | | | | | | |
| hardness (JIS-A) | 78 | 76 | 77 | 74 | 77 | 80 |
| 100% modulus (kg/cm²) | 43 | 47 | 49 | .50 | 45 | 69 |
| tensile strength (kg/cm²) | 210 | 180 | 144 | 230 | 200 | 123 |
| fracture elongation (%) | 380 | 345 | 320 | 450 | 400 | 310 |
| E' (longitudinal direction)/ E' (transverse direction) | 10 | 8 | 7 | 9 | 9 | 2 |
| De MATTIA flex fatigue resistance 5) | 30000 | 45000 | 28000 | 35000 | 10000 | 10000 |
| belt lifetime (hour) | 260 | 310 | 250 | 230 | 180 | 130 |

1) Zetpol 2020 by NIPPON ZEON Co., LTD.
2) fine-diameter nylon fiber grafted with NBR molecular (40 wt % nylon, 0.3 μm fiber diameter, 300 μm fiber length)
3) 1,3-bis-(t-butylperoxy-iso-propyl) benzene (40% fineness)
4) 1.14 specific gravity, 28 μm fiber diameter, 3 mm fiber length
5) number of times that crackings grow from 2 to 10 mm, 40–80 mm stroke (WORKING EXAMPLE 2)

The rubber composition of chlorosufonated polyethylene rubber indicated in Table 2 is mixed and kneaded by the Banbury mixer, than rolled by the calendar roll to orient the short fiber of nylon-66 (3 mm length) in the belt width direction, thus obtaining is an unvulcanized rubber sheet. The amount of the short fiber added is 10 wt. % together with the fine-diameter nylon fiber grafted with the rubber, as well as in the first working example. The unvulcanized rubber sheet is vulcanized at 160° C. for 30 minutes to obtain a vulcanized rubber sheet. The property of the vulcanized rubber sheet is indicated in Table 2.

The V-ribbed belt A is made using the unvulcanized rubber sheet as the ribbed rubber layer 5 as well as in the first working example, and the lifetime shortened by dynamic fatigue is measured after the same running test as in the first example. The results are indicated in Table 2.

TABLE 2

|  | present invention | | | comparable examples | |
|---|---|---|---|---|---|
|  | 1 | 2 | 3 | 1 | 2 |
| unvulcanized rubber composition (weight part) | | | | | |
| chlorosulfonated polyethylene 1) | 100 | 100 | 100 | 100 | 100 |
| SCM-II 2) | 5 | 10 | 30 | — | 60 |
| FEF carbon | 50 | 50 | 50 | 50 | 50 |
| MgO | 4 | 4 | 4 | 4 | 4 |
| paraffinic process oil | 10 | 10 | 10 | 10 | 10 |
| pentaerythritol 3) | 2 | 2 | 2 | 2 | 2 |
| promoter TRA 4) | 1 | 1 | 1 | 1 | 1 |
| nylon-66 5) | 13 | 11 | 3 | 15 | — |
| vulcanized rubber property (transverse direction) | | | | | |
| hardness (JIS-A) | 75 | 76 | 74 | 75 | 78 |
| 100% modulus (kg/cm²) | 56 | 53 | 55 | 52 | 75 |
| tensile strength (kg/cm²) | 130 | 150 | 126 | 130 | 99 |
| fracture elongation (%) | 240 | 230 | 200 | 260 | 150 |
| E' (longitudinal direction)/ E' (transverse direction) | 9 | 8 | 6.5 | 9 | 3 |
| De MATTIA flex fatigue resistance 6) | 20000 | 30000 | 15000 | 5000 | 4000 |
| belt lifetime (hour) | 200 | 260 | 160 | 115 | 78 |

1) Hypalon #40 by Du Pont
2) fine-diameter nylon fiber grafted with CSM molecular (40 wt % nylon, 0.3 μm fiber diameter, 300 μm fiber length)
3) Adekacizer K-2 by ADEKA ARGUS CHEMICAL CO., LTD.
4) promoter:dipentamethylenethiuram tetrasulfide
5) 1.14 specific gravity, 28 μm fiber diameter, 3 mm fiber length
5) number of times that crackings grow from 2 to 10 mm, 40–80 mm stroke (WORKING EXAMPLE 3)

The rubber composition of alkylated chlorosulfonated polyethylene rubber indicated in Table 3 is mixed and kneaded by the Banbury mixer, than rolled by the calendar roll to orient the short fiber of nylon-66 (3 mm length) in the belt width direction, thus obtaining an unvulcanized rubber sheet. The amount of the short fiber added is 10 wt. % together with the fine-diameter nylon fiber grafted with the rubber, as well as in the first working example. The unvulcanized rubber sheet is vulcanized at 160° C. for 30 minutes to obtain a vulcanized rubber sheet. The property of the vulcanized rubber sheet is indicated in Table 3.

The V-ribbed belt A is made using the unvulcanized rubber sheet as the ribbed rubber layer 5 as well as in the first working example, and the lifetime shortened by dynamic fatigue is measured after the same running test as in the first example. The results are indicated in Table 3.

TABLE 3

|  | present invention | | | comparable examples | |
|---|---|---|---|---|---|
|  | 1 | 2 | 3 | 1 | 2 |
| unvulcanized rubber composition (weight part) | | | | | |
| alkylated chlorosulfonated polyethylene 1) | 100 | 100 | 100 | 100 | 100 |
| CSM-II 2) | 5 | 10 | 30 | — | 60 |
| FEF carbon | 50 | 50 | 50 | 50 | 50 |
| MgO | 4 | 4 | 4 | 4 | 4 |
| plasticizer 3) | 10 | 10 | 10 | 10 | 10 |
| pentaerythritol 4) | 2 | 2 | 2 | 2 | 2 |
| promoter TRA 5) | 1 | 1 | 1 | 1 | 1 |
| nylon-66 6) | 13 | 11 | 3 | 15 | — |
| Vulcanized rubber property (transverse direction) | | | | | |
| hardness (JIS-A) | 77 | 74 | 75 | 76 | 77 |
| 100% modulus (kg/cm$^2$) | 58 | 57 | 59 | 55 | 78 |
| tensile strength (kg/cm$^2$) | 120 | 140 | 135 | 125 | 90 |
| fracture elongation (%) | 250 | 240 | 230 | 250 | 160 |
| E' (longitudinal direction)/ E' (transverse direction) | 9 | 7.5 | 5.5 | 9 | 3.5 |
| De MATTIA flex fatigue resistance 7) | 12000 | 28000 | 11000 | 4000 | 2500 |
| belt lifetime (hour) | 180 | 230 | 160 | 110 | 80 |

1) Acsium by Du Pont
2) fine-diameter nylon fiber grafted with CSM molecular (40 wt % nylon, 0.3 μm fiber diameter, 300 μm fiber length)
3) dioctyl sebacate
4) Adekacizer K-2 by ADEKA ARGUS CHEMICAL CO., LTD.
4) promoter:dipentamethylenethiuram tetrasulfide
5) 1.14 specific gravity, 28 μm fiber diameter, 3 mm fiber length
5) number of times that crackings grow from 2 to 10 mm, 40–80 mm stroke (WORKING EXAMPLE 4)

The rubber composition of chloroprene rubber indicated in Table 4 is mixed and kneaded by the Banbury mixer, than rolled by the calendar roll to orient the short fiber of nylon-66 (3 mm length) in the belt width direction, thus obtaining an unvulcanized rubber sheet. The amount of the short fiber added is 10 wt. % together with the fine-diameter nylon fiber grafted with the rubber, as well as in the first working example. The unvulcanized rubber sheet is vulcanized at 160° C. for 30 minutes to obtain a vulcanized rubber sheet. The property of the vulcanized rubber sheet is indicated in Table 4.

The V-ribbed belt A is made using the unvulcanized rubber sheet as the ribbed rubber layer 5 as well as in the first working example, and the lifetime shortened by dynamic fatigue is measured after the same running test as in the first example. The results are indicated in Table 4.

TABLE 4

|  | present invention | | | comparable examples | |
|---|---|---|---|---|---|
|  | 1 | 2 | 3 | 1 | 2 |
| unvulcanized rubber composition (weight part) | | | | | |
| chloroprene 1) | 100 | 100 | 100 | 100 | 100 |
| CSM-II 2) | 5 | 10 | 30 | — | 60 |
| FEF carbon | 50 | 50 | 50 | 50 | 50 |
| MgO | 4 | 4 | 4 | 4 | 4 |
| ZnO | 5 | 5 | 5 | 5 | 5 |
| plasticizer 3) | 10 | 10 | 10 | 10 | 10 |
| nylon-66 4) | 13 | 11 | 3 | 15 | — |
| Vulcanized rubber property (transverse direction) | | | | | |
| hardness (JIS-A) | 78 | 77 | 74 | 78 | 80 |
| 100% modulus (kg/cm$^2$) | 53 | 52 | 48 | 51 | 82 |
| tensile strength (kg/cm$^2$) | 130 | 118 | 110 | 130 | 100 |
| fracture elongation (%) | 250 | 230 | 190 | 280 | 130 |
| E' (longitudinal direction)/ E' (transverse direction) | 9 | 7.5 | 5 | 9 | 2 |
| De MATTIA flex fatigue resistance 6) | 18000 | 24000 | 12000 | 6000 | 1500 |
| belt lifetime (hour) | 210 | 230 | 140 | 125 | 50 |

1) GRT by Du PONT-SHOWA DENKO CO., LTD.
2) fine-diameter nylon fiber grafted with CSM molecular (40 wt % nylon, 0.3 μm fiber diameter, 300 μm fiber length)
3) dioctyl sebacate
4) 1.14 specific gravity, 28 μm fiber diameter, 3 mm fiber length
5) number of times that crackings grow from 2 to 10 mm, 40–80 mm stroke

TABLE 5

| No. | added amount of short fiber (phr) | total added amount of fine-diameter nylon fiber (phr) | fiber amount in fine-diameter nylon fiber (phr) | belt lifetime (hr) |
|---|---|---|---|---|
| 1 | 1 | 1 | 0.4 | 170 |
| 2 | 3 | 1 | 0.4 | 175 |
| 3 | 5 | 1 | 0.4 | 180 |
| 4 | 10 | 1 | 0.4 | 190 |
| 5 | 20 | 1 | 0.4 | 170 |
| 6 | 30 | 1 | 0.4 | 152 |
| 7 | 40 | 1 | 0.4 | 138 |
| 8 | 1 | 2.5 | 1 | 220 |
| 9 | 3 | 2.5 | 1 | 235 |
| 10 | 5 | 2.5 | a | 242 |
| 11 | 10 | 2.5 | 1 | 279 |
| 12 | 20 | 2.5 | 1 | 230 |
| 13 | 30 | 2.5 | 1 | 330 |
| 14 | 40 | 2.5 | 1 | 129 |
| 15 | 1 | 10 | 4 | 270 |
| 16 | 3 | 10 | 4 | 275 |
| 17 | 5 | 10 | 4 | 300 |
| 18 | 10 | 10 | 4 | 350 |
| 19 | 20 | 10 | 4 | 308 |
| 20 | 30 | 10 | 4 | 240 |
| 21 | 40 | 10 | 4 | 121 |
| 22 | 1 | 25 | 10 | 272 |
| 23 | 3 | 25 | 10 | 280 |
| 24 | 5 | 25 | 10 | 286 |
| 25 | 10 | 25 | 20 | 345 |
| 26 | 20 | 25 | 10 | 293 |
| 27 | 30 | 25 | 10 | 230 |
| 28 | 40 | 25 | 10 | 110 |
| 29 | 1 | 37.5 | 15 | 240 |
| 30 | 3 | 37.5 | 15 | 243 |
| 31 | 5 | 37.5 | 15 | 252 |
| 32 | 10 | 37.5 | 15 | 240 |
| 33 | 20 | 37.5 | 15 | 228 |
| 34 | 30 | 37.5 | 15 | 221 |
| 35 | 40 | 37.5 | 15 | 102 |
| 36 | 1 | 50 | 20 | 178 |
| 37 | 3 | 50 | 20 | 173 |
| 38 | 5 | 50 | 20 | 165 |
| 39 | 10 | 50 | 20 | 142 |

TABLE 5-continued

| No. | added amount of short fiber (phr) | total added amount of fine-diameter nylon fiber (phr) | fiber amount in fine-diameter nylon fiber (phr) | belt lifetime (hr) |
|---|---|---|---|---|
| 40 | 20 | 50 | 20 | 103 |
| 41 | 30 | 50 | 20 | not run |
| 42 | 40 | 50 | 20 | not run |

TABLE 6

| No. | diameter (μm) | length (mm) | belt lifetime (hr) |
|---|---|---|---|
| 1 | 8 | 1 | 180 |
| 2 | 8 | 2 | 200 |
| 3 | 12 | 0.6 | 234 |
| 4 | 12 | 1 | 265 |
| 5 | 12 | 2 | 280 |
| 6 | 12 | 3 | 290 |
| 7 | 12 | 5 | 250 |
| 8 | 12 | 6 | 240 |
| 9 | 14 | 0.6 | 285 |
| 10 | 14 | 1 | 280 |
| 11 | 14 | 2 | 298 |
| 12 | 14 | 3 | 276 |
| 13 | 14 | 5 | 260 |
| 14 | 14 | 6 | 245 |
| 15 | 23 | 0.6 | 306 |
| 16 | 23 | 1 | 290 |
| 17 | 23 | 2 | 343 |
| 18 | 23 | 3 | 320 |
| 19 | 23 | 5 | 306 |
| 20 | 23 | 6 | 266 |
| 21 | 28 | 0.6 | 258 |
| 22 | 28 | 1 | 312 |
| 23 | 28 | 2 | 300 |
| 24 | 28 | 3 | 310 |
| 25 | 28 | 5 | 290 |
| 26 | 37 | 0.6 | 251 |
| 27 | 37 | 1 | 288 |
| 28 | 37 | 2 | 278 |
| 29 | 37 | 3 | 261 |
| 30 | 37 | 5 | 252 |
| 31 | 50 | 0.6 | 240 |
| 32 | 50 | 1 | 228 |
| 33 | 50 | 2 | 236 |
| 34 | 50 | 3 | 230 |
| 35 | 80 | 1 | 130 |
| 36 | 80 | 2 | 80 |

In each working example, the present invention is superior to the comparable examples in De MATTIA flex fatigue resistance and belt lifetime.

In the working examples, the rubber composition according to the present invention is applied to the ribbed rubber layer 5 in the V-ribbed belt A, but is applicable to a tension rubber and a compression rubber according to belt kinds.

The rubber composition according to the present invention may be applied to a toothed belt, a V-belt, and the like, as well as the V-ribbed belt A in the working examples.

We claim:

1. A rubber composition comprising:

a rubber forming a continuous phase of 100 weight parts;

a nylon fiber having a diameter of about 0.3 μm and a length of about 300 μm of 1 to 15 weight parts, the nylon fiber being grafted with a rubber capable of co-cross-linking to the rubber forming the continuous phase; and a nylon fiber having a diameter of between about 10 and 50 μm and a length of between about 0.3 and 6.0 mm of 1 to 30 weight parts.

2. A transmission belt comprising at least a part composed of a rubber composition containing:

a rubber forming a continuous phase of 100 weight parts;

a nylon fiber having a diameter of about 0.3 μm and a length of about 300 μm of 1 to 15 weight part, the nylon fiber being grafted with a rubber capable of co-cross-linking to the rubber forming the continuous phase; and a nylon fiber having a diameter of between about 10 and 50 μm and a length of between 0.3 and 6.0 mm of 1 to 30 weight parts.

3. The rubber composition according to claim 1, wherein the rubber forming the continuous phase is hydrogenated acrylonitrile butadiene rubber obtained by adding hydrogen to a copolymer of acrylonitrile and 1,3 butadiene, and saturating the double band in a conjugative diene monomer in the added copolymer, and the grafted rubber capable of co-cross-linking thereto is acrylonitrile butadiene rubber or hydrogenated acrylonitrile butadiene rubber.

4. The rubber composition according to claim 1, wherein the rubber forming the continuous phase and the grafted the rubber capable of co-cross-linking thereto are chlorosulfonated polyethylene rubber.

5. The rubber composition according to claim 1, wherein the rubber forming the continuous phase and the grafted rubber capable of co-cross-linking thereto are alkylated chlorosulfonated polyethylene rubber.

6. The rubber composition according to claim 1, wherein the rubber forming the continuous phase and the grafted rubber capable of co-cross-linking thereto are chloroprene rubber.

7. The rubber composition according to claim 1, wherein the rubber forming the continuous phase is chloroprene rubber, and the grafted rubber capable of co-cross-linking thereto is chlorosulfonated polyethylene rubber or alkylated chlorosulfonated polyethylene rubber.

8. The transmission belt according to claim 2, wherein the rubber forming the continuous phase is hydrogenated acrylonitrile butadiene rubber obtained by adding hydrogen to a copolymer of acrylonitrile and 1,3 butadiene, and saturating the double bond in a conjugative diene monomer in the added copolymer, and the grafted rubber capable of co-cross-linking thereto is acrylonitrile butadiene rubber or hydrogenated acrylonitrile butadiene rubber.

9. The transmission belt according to claim 2, wherein the rubber forming the continuous phase and the grafted rubber capable of co-cross-linking thereto are chlorosulfonated polyethylene rubber.

10. The transmission belt according to claim 2, wherein the rubber forming the continuous phase and the grafted rubber capable of co-cross-linking thereto are alkylated chlorosulfonated polyethylene rubber.

11. The transmission belt according to claim 2, wherein the rubber forming the continuous phase and the grafted rubber capable of co-crosslinking thereto are chloroprene rubber.

12. The transmission belt according to claim 2, wherein the rubber forming the continuous phase is chloroprene rubber, and the grafted rubber capable of co-cross-linking thereto is chlorosulfonated polyethylene rubber or alkylated chlorosulfonated polyethylene rubber.

* * * * *